United States Patent
Mendhekar

(10) Patent No.: US 10,462,477 B2
(45) Date of Patent: Oct. 29, 2019

(54) PARTIAL EVALUATOR SYSTEM AND METHOD

(71) Applicant: Cinova Media, Mountain View, CA (US)

(72) Inventor: Anurag Mendhekar, Los Altos, CA (US)

(73) Assignee: Cinova Media, Redwood City, CA (US)

( * ) Notice: Subject to any disclaimer, the term of this patent is extended or adjusted under 35 U.S.C. 154(b) by 0 days.

(21) Appl. No.: 15/052,244

(22) Filed: Feb. 24, 2016

(65) Prior Publication Data

US 2016/0247250 A1  Aug. 25, 2016

Related U.S. Application Data

(60) Provisional application No. 62/120,660, filed on Feb. 25, 2015.

(51) Int. Cl.
| | |
|---|---|
| G06K 9/36 | (2006.01) |
| H04N 19/44 | (2014.01) |
| H04N 19/85 | (2014.01) |
| G06F 7/544 | (2006.01) |
| G06F 17/10 | (2006.01) |

(52) U.S. Cl.
CPC ............ *H04N 19/44* (2014.11); *G06F 7/544* (2013.01); *G06F 17/10* (2013.01); *H04N 19/85* (2014.11)

(58) Field of Classification Search
CPC ......... G06F 17/10; G06F 7/544; H04N 19/44; H04N 19/85
See application file for complete search history.

(56) References Cited

U.S. PATENT DOCUMENTS

| | | |
|---|---|---|
| 5,596,659 A | 1/1997 | Normile et al. |
| 5,703,799 A | 12/1997 | Ohta |
| 5,900,849 A | 5/1999 | Gallery |
| 6,016,360 A | 1/2000 | Nguyen et al. |
| 6,052,205 A | 4/2000 | Matsuura |
| 6,128,407 A | 10/2000 | Inoue et al. |
| 6,393,156 B1 | 5/2002 | Nguyen et al. |
| 6,463,178 B1 | 10/2002 | Kondo et al. |
| 6,466,254 B1 | 10/2002 | Furlan et al. |
| 6,625,221 B2 | 9/2003 | Knee et al. |
| 6,690,731 B1 | 2/2004 | Gough et al. |
| 6,697,521 B2 | 2/2004 | Islam et al. |
| 6,792,153 B1 | 9/2004 | Tsujii |
| 6,938,073 B1 * | 8/2005 | Mendhekar ........... G06F 17/211 707/E17.121 |
| 7,003,167 B2 | 2/2006 | Mukherjee |

(Continued)

FOREIGN PATENT DOCUMENTS

| | | |
|---|---|---|
| JP | 2003-018412 | 1/2003 |
| JP | 2004-173205 | 6/2004 |

(Continued)

*Primary Examiner* — Li Liu
(74) *Attorney, Agent, or Firm* — DLA Piper LLP (US)

(57) ABSTRACT

A partial evaluator system and method are disclosed. The disclosure may be particularly applicable to partial evaluation in image and video signal processing. The partial evaluation system and method also may be used for other signal processing methods and may be used, more generally, for other complicated processing operations.

38 Claims, 8 Drawing Sheets

(56) References Cited

U.S. PATENT DOCUMENTS

| | | |
|---|---|---|
| 7,149,811 B2 | 12/2006 | Wise et al. |
| 7,791,508 B2 | 9/2010 | Wegener |
| 7,916,960 B2 | 3/2011 | Mizuno |
| 7,965,900 B2 | 6/2011 | Maurer et al. |
| 8,077,990 B2 | 12/2011 | Islam |
| 8,130,828 B2 | 3/2012 | Hsu et al. |
| 8,265,144 B2 | 9/2012 | Christoffersen et al. |
| 8,422,804 B2 | 4/2013 | Islam |
| 8,463,033 B2 | 6/2013 | Islam |
| 8,639,057 B1 | 1/2014 | Mendhekar et al. |
| 8,811,736 B2 | 8/2014 | Islam |
| 9,042,644 B2 | 5/2015 | Mendhekar et al. |
| 9,230,341 B2 | 1/2016 | Islam |
| 2001/0031009 A1 | 10/2001 | Knee et al. |
| 2001/0041011 A1 | 11/2001 | Passagio et al. |
| 2001/0048770 A1 | 12/2001 | Maeda |
| 2003/0002734 A1 | 1/2003 | Islam et al. |
| 2003/0202581 A1 | 10/2003 | Kodama |
| 2003/0206590 A1 | 11/2003 | Krishnamachari |
| 2004/0264793 A1 | 12/2004 | Okubo |
| 2005/0063599 A1 | 3/2005 | Sato |
| 2006/0039473 A1 | 2/2006 | Filippini et al. |
| 2006/0115166 A1 | 6/2006 | Sung et al. |
| 2006/0285587 A1 | 12/2006 | Luo et al. |
| 2007/0019875 A1 | 1/2007 | Sung et al. |
| 2007/0206871 A1 | 9/2007 | Jalil et al. |
| 2007/0237237 A1 | 10/2007 | Chang et al. |
| 2007/0248163 A1 | 10/2007 | Zuo et al. |
| 2008/0247658 A1 | 10/2008 | Lee et al. |
| 2010/0020868 A1 | 1/2010 | Ayres, Jr. et al. |
| 2010/0066912 A1 | 3/2010 | Kumwilaisak et al. |
| 2010/0329358 A1 | 12/2010 | Zhang et al. |
| 2011/0103445 A1 | 5/2011 | Jax et al. |
| 2011/0200262 A1 | 8/2011 | Canel-Katz et al. |
| 2011/0206287 A1 | 8/2011 | Islam |
| 2011/0307685 A1* | 12/2011 | Song ................. G06F 17/10 712/16 |
| 2013/0072299 A1* | 3/2013 | Lee ................. H04N 19/51 463/32 |
| 2014/0133583 A1 | 5/2014 | Lin et al. |
| 2014/0188451 A1 | 7/2014 | Asahara et al. |
| 2015/0055937 A1 | 2/2015 | Van Hoff et al. |
| 2016/0073114 A1* | 3/2016 | Kawamura ........... H04N 19/12 375/240.03 |

FOREIGN PATENT DOCUMENTS

| | | |
|---|---|---|
| JP | 2007-104645 | 4/2007 |
| JP | 2007-318711 | 12/2007 |
| KR | 2003-0007080 | 1/2003 |
| KR | 2010-0918377 | 9/2009 |
| WO | WO2003/103295 | 12/2003 |
| WO | WO 2006/061734 | 6/2006 |

* cited by examiner

PARTIAL EVALUATOR SYSTEM AND METHOD

PRIORITY CLAIMS/RELATED APPLICATIONS

This application claims the benefit under 35 USC 119(e) and priority under 35 USC 120 to U.S. Provisional Application No. 62/120,660, filed Feb. 25, 2015 and entitled "Partial Evaluator System and Method", the entirety of which is incorporated herein by reference.

FIELD

The disclosure relates generally to the partial evaluation of an equation and in particular to the partial evaluation of an equation for signal processing.

BACKGROUND

Signal processing often involves fairly complicated operations to be performed in order to perform the particular signal processing. For example, in image and video signal processing, a process to decode an encoded image or video involves a large number of matrix operations. Similarly, the process to encode an encoded image or video involves a large number of matrix operations.

The signal processing may utilize complex operations to achieve the goals of the process. Those complex operations require a large number of discrete operations to be performed. Often, those complex operations receive one or more variables and then perform an operation based on those one or more variables.

DETAILED DESCRIPTION OF ONE OR MORE EMBODIMENTS

The disclosure is particularly applicable to partial evaluation in image and video signal processing and it is in this context that the disclosure will be described. It will be appreciated, however, that the system and method has greater utility since the partial evaluation also may be used for other signal processing methods and may be used, more generally, for other complicated processing operations.

Figure 1:
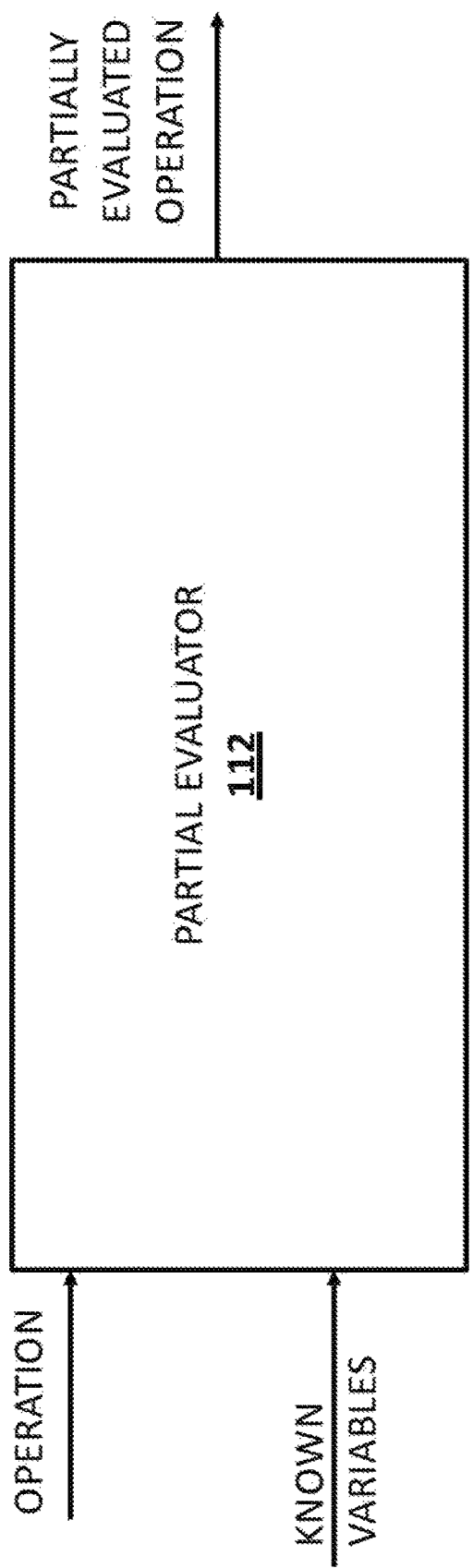
FIG. 1 illustrates an embodiment of a partial evaluator apparatus.

FIG. 1 illustrates an embodiment of a partial evaluator apparatus 112. The partial evaluator apparatus 112 may be used to partially evaluate an operation, such as a signal processing operation. The operation may have one or more sub-operations and a plurality of variables that are processed by the sub-operations to arrive at a result of the operation. Some of the plurality of variables are known (e.g., are a constant value, have a known value and/or have a known range of values) and the partial evaluator apparatus 112 uses the known variables and the original operation as shown in FIG. 1 to generate a partially evaluated operation as shown in FIG. 1. The partial evaluation of the operation results in an optimized operation that may be completed in less computing time or with less computing complexity due to the partial evaluation. In some embodiments, the partial evaluator apparatus 112 may generate specialized code that is optimized for execution on a particular processing unit, such as a graphics processing unit. For example, the specialized code may be computer code that does not contain any loops which means that it is easier to executed by a processing unit. In one embodiment, the partial evaluator apparatus 112 may generate C or C++ functions that are optimized for the particular operation.

Figure 2:
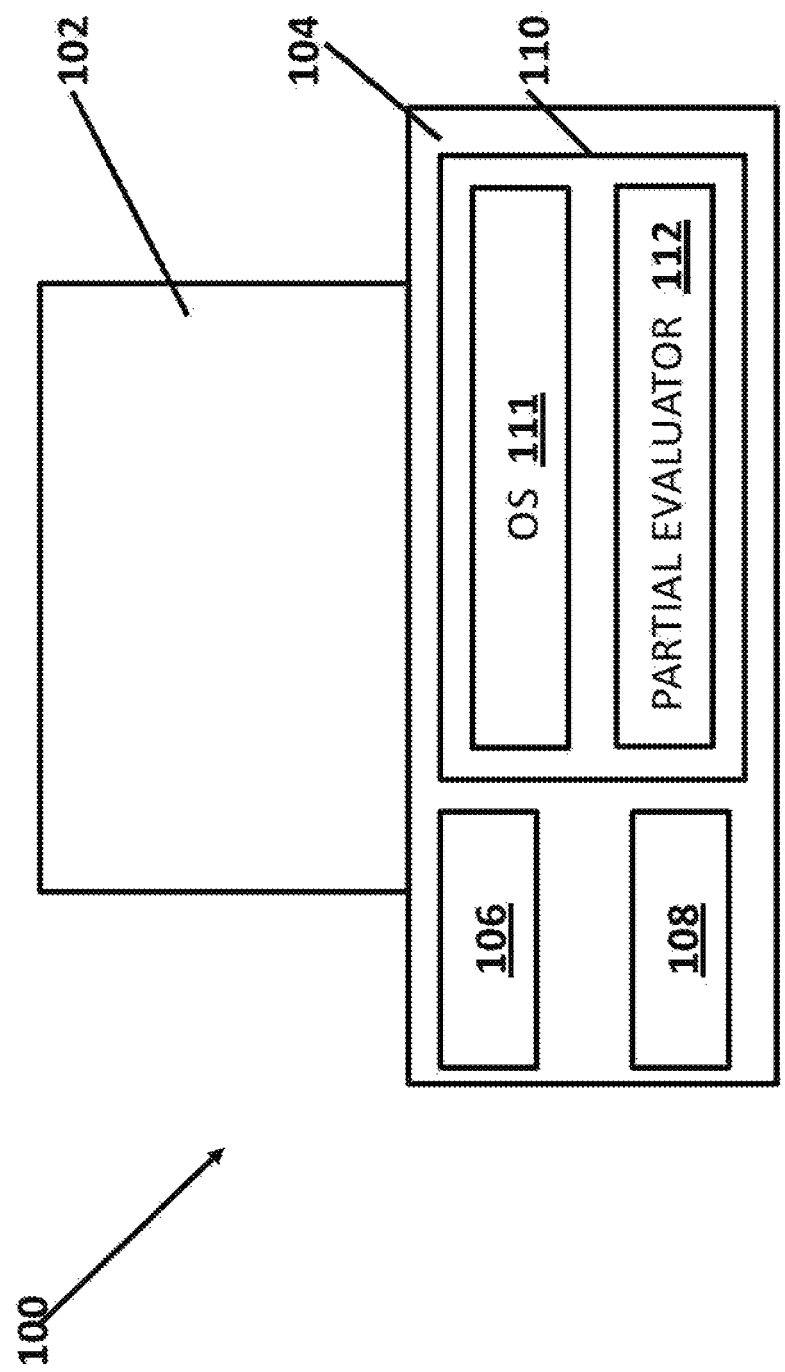
FIG. 2 illustrates a computer system implementation of a partial evaluation apparatus.
Figure 3:
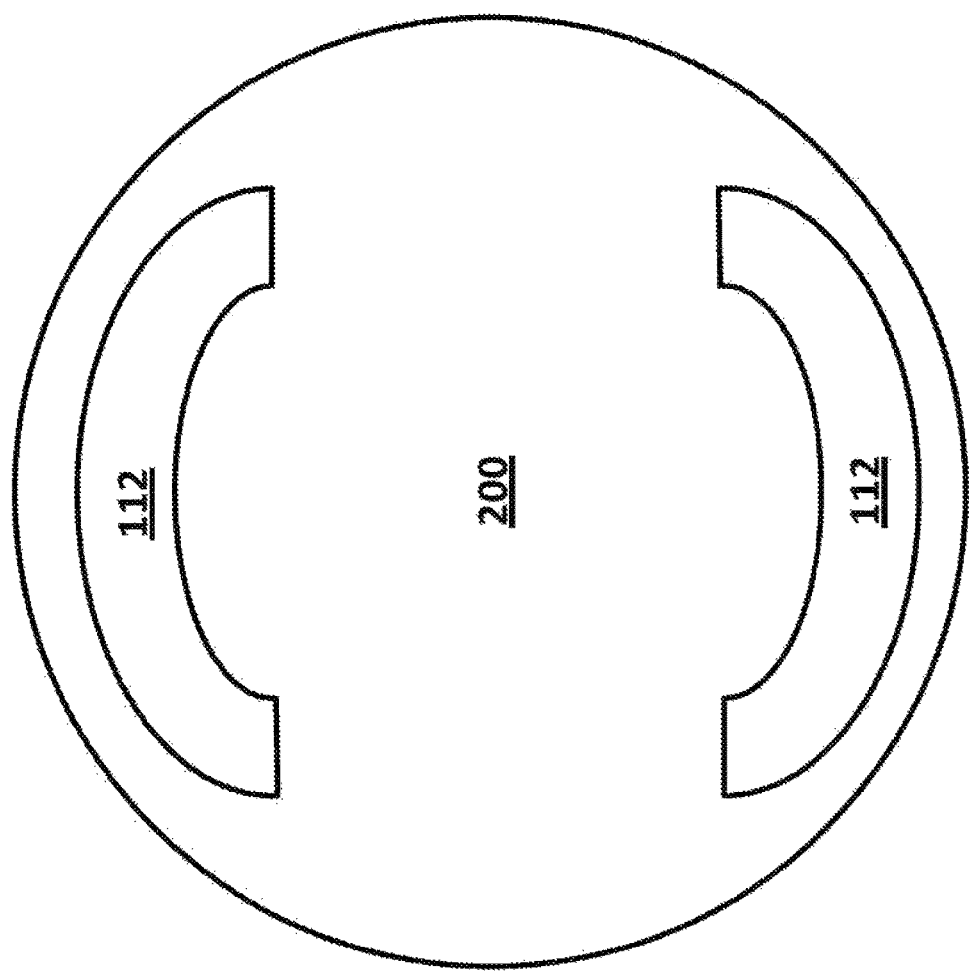
FIG. 3 illustrates a computer readable medium implementation of the partial evaluation apparatus.

FIG. 2 illustrates a computer system 100 implementation of a partial evaluation apparatus 112 in which the partial evaluator apparatus 112 may be stored and executed by a computer system 100. The computer system 100 may be any type of computer system including cloud computing resources, mainframe computer, standalone computer, a laptop computer, a tablet computer, a blade server, a server computer, a smartphone device and the like. The example in FIG. 2 is a personal computer system that has a display 102 and a chassis 104 and one or more input/output devices that are not shown that allow a user to interact with the computer system. In some computer systems listed above, the computer system may not have a display or the input/output devices. The personal computer system 100 may further comprise one or more processors 106, a persistent storage device 108 and a memory 110 that are interconnected together within the chassis 104. The partial evaluator may be stored in the memory 110 (along with an operating system 111 and other software programs) and then executed by the one or more processing units 106 when the partial evaluation method is being performed. In this example, the partial evaluator apparatus 112 may be a plurality of lines of computer code that may be executed by the processors 106 so that the one or more processors are configured to perform the processes of partial evaluation shown in FIGS. 5-8. Alternatively, the partial evaluator apparatus 112 may be hardware device, such as a programmable logic device, that can implement the partial evaluation described elsewhere. FIG. 3 illustrates a computer readable medium 200 implementation of the partial evaluation apparatus 112 in which the partial evaluation apparatus 112 is a plurality of lines of computer code stored on a computer readable medium, such as a DVD, CD, optical disk, etc. so that an authorized user may transfer the partial evaluator apparatus 112 to a computer system 100 such as shown in FIG. 2. The partial evaluator may also be stored on a server computer or on a cloud computing resource and then downloaded by an authorized user for execution on a computer system.

Figure 4:
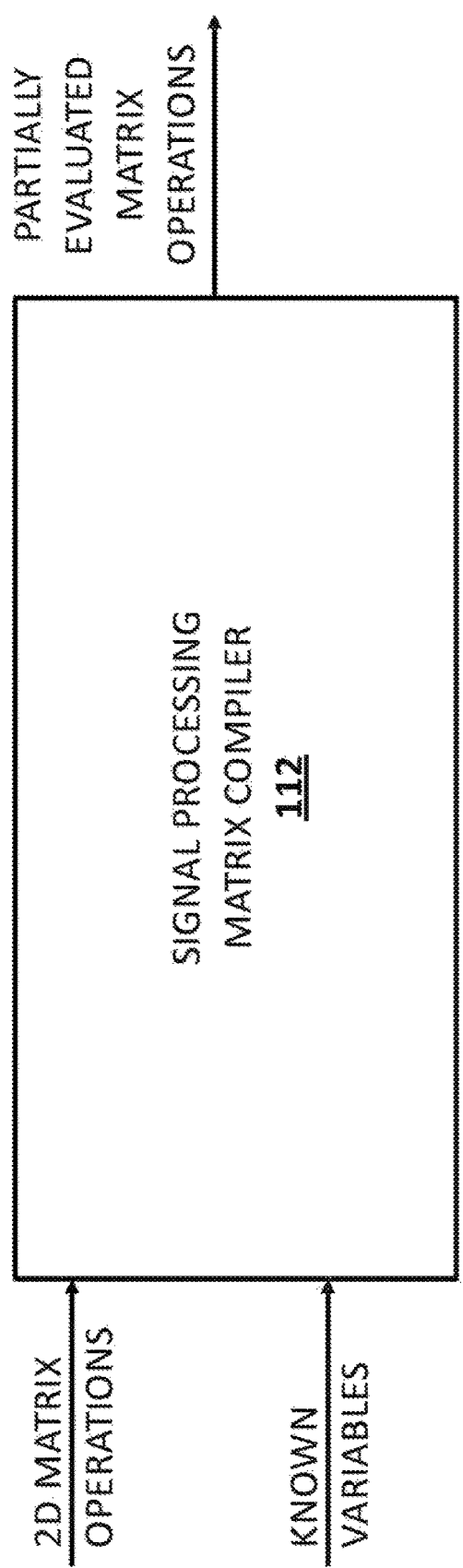
FIG. 4 illustrates a signal processing matrix compiler implementation of the partial evaluation apparatus.

FIG. 4 illustrates a signal processing matrix compiler implementation of the partial evaluation apparatus 112 in which the partial evaluator apparatus is used for signal processing operations, such as decoding of digital display data. The digital display data may include image data and/or video data. When the digital display data is processed, such as by using an h.264 standard, two dimensional matrix operations may be used during the signal processing. Such operations include, prediction (both intra and inter prediction) at different block sizes (such as 4×4, 8×8 and 16×16), transform (DCT at 4×4 and 8×8, as well as Hadamard transforms), quantization and scaling of coefficients.

The matrix operations may operate on matrix data types and the matrix operations may include linear sub-operations, such as addition and multiplication, and non-linear sub-operations, such as pixelwise sub-operations. The known variables in these matrix operations may include fixed digital data block sizes, such as 2×2, 4×4, 8×8 and/or 16×16, that are processed using the decoding method.

So, for example, one operation during matrix manipulation could be summing the values of a matrix along its columns. In this case, the matrix will be multiplied by a constant matrix of the same size consisting of all 1 s. In one embodiment of the matrix compiler, this will be written as: (⊙(2×2-block 1)A). Here, the ⊙ operation is the matrix multiplication operation, and the 2×2 block function will construct a 2×2 matrix with the value 1 at all positions. The matrix variable A is the unknown value here. This operation can be partially evaluated at compile time. Assuming that the matrix variable A (of size 2×2) can be represented like this:

$$\begin{matrix} A_0 & A_1 \\ A_2 & A_3 \end{matrix}$$

When you partially evaluate the matrix multiplication operation described above with a fixed 2×2 block of all 1 s, the partially evaluated result will look like this:

$$\begin{matrix} A_0 + A_2 & A_1 + A_3 \\ A_0 + A_2 & A_1 + A_3 \end{matrix}$$

In one embodiment, this code can be generated from this matrix and the repeated computations can be reduced using common sub-expression elimination techniques. The code generated is similar to the following (in a representative C-like code)

int V0=A[0]+A[2];
int V1=A[1]+A[3]:
return [V0,V1,V0,V1];

Additionally, the known variables in the matrix operation may include one or more variable(s) that have a known range of values, such as 0 . . . 32 or 0 . . . 51 in h.264. So, for example, when a matrix of DCT coefficients is available, the number of non-zero coefficients may be any where from 0 to 16 (in case of 4×4 blocks), or 0-64 in case of 8×8 blocks. In this case, the non-zero size of the DCT matrix is the "known variable" in the operation. This information can be used to partially evaluate a given DCT operation with respect to each possible value of the size of the block. This will create multiple versions of the operation, one for each possible size. Continuing our example from before, if the 2×2 matrix is known to have a non-zero size to be 2, then it has 0's in the A2 and A3 position, the resulting matrix partially evaluated matrix will look like:

$$\begin{matrix} A_0 & A_1 \\ A_0 & A_1 \end{matrix}$$

Figure 5:
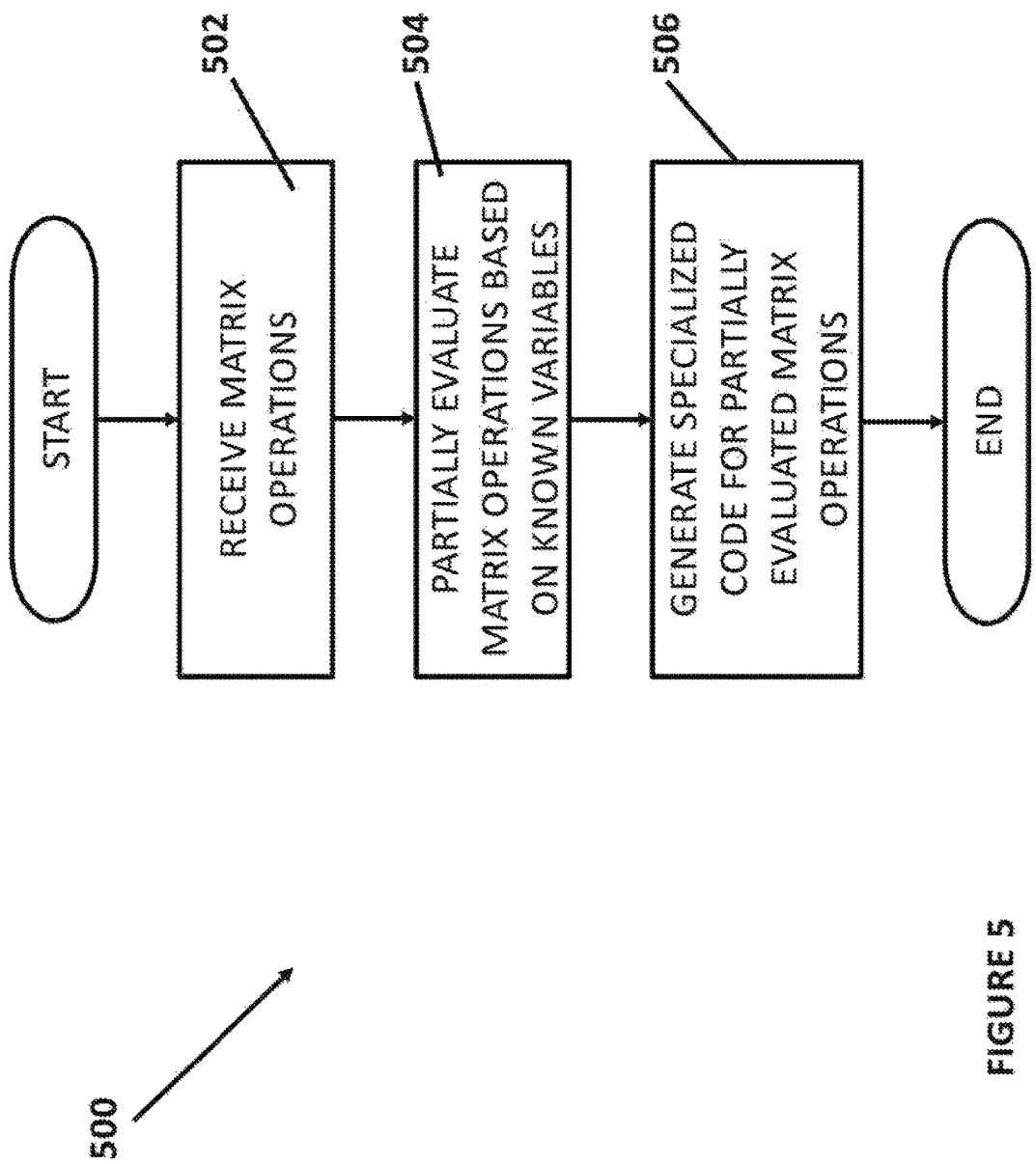
FIG. 5 is a flowchart illustrating a method for signal processing partial evaluation.

And the corresponding generated code will look like:
int V0=A[0];
int V1=A[1]:
return [V0,V1,V0,V1];

FIG. 5 is a flowchart illustrating a method 500 for signal processing partial evaluation. In the method, the partial evaluator apparatus may receive the matrix operation (502) and the known variables. The partial evaluator apparatus may then partially evaluate the matrix operation based on the known variables (504) which results in the partial evaluation which may be stored. In some examples, the partial evaluation may be specialized code that is generated (506) and may be stored. This method is illustrated in the examples above.

Figure 6:
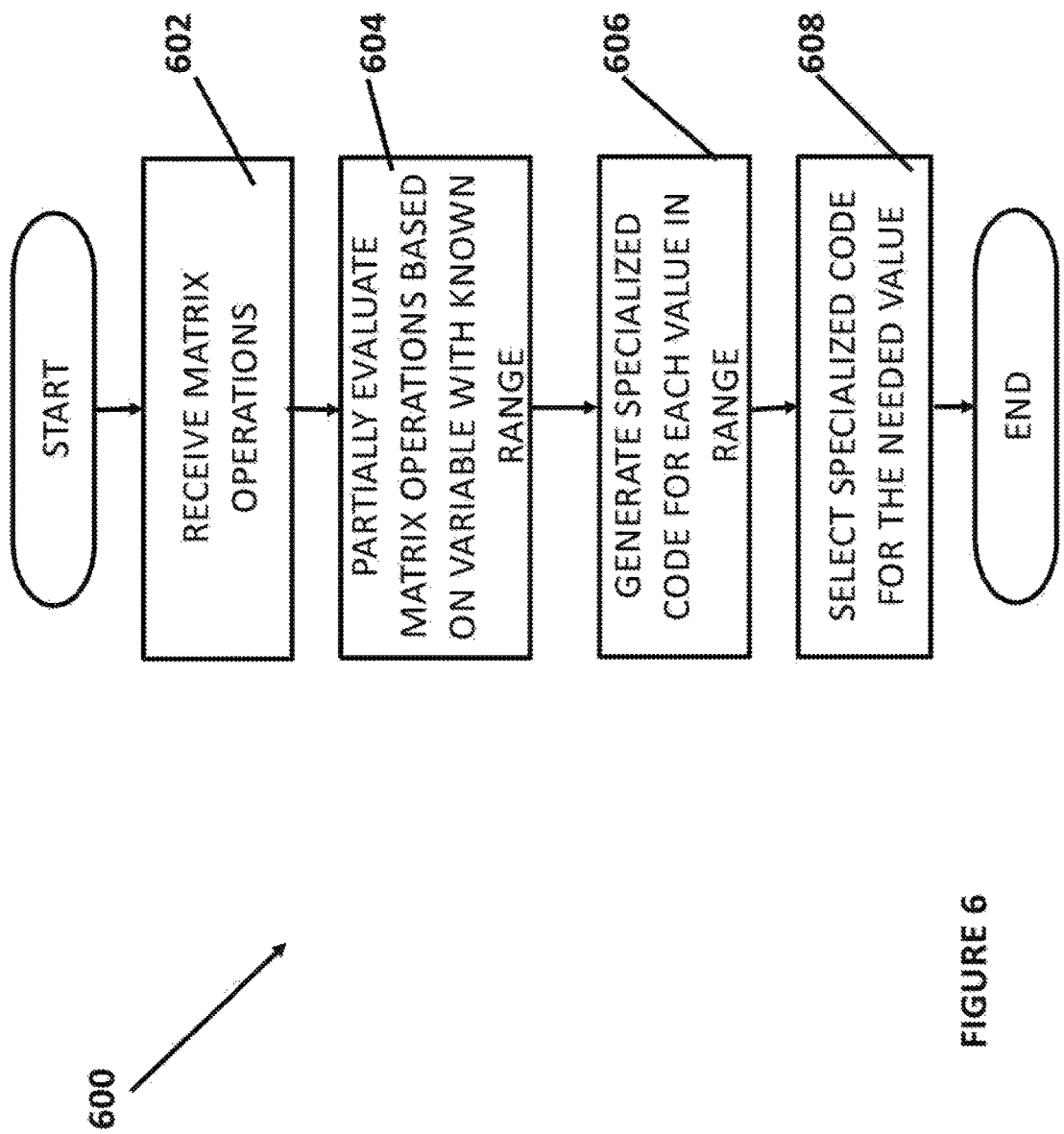
FIG. 6 is a flowchart illustrating an alternative method for signal processing partial evaluation.

FIG. 6 is a flowchart illustrating an alternative method 600 for signal processing partial evaluation. In the method, the partial evaluator apparatus may receive the matrix operation (602) and the known variables that has a known range of values. The partial evaluator apparatus may then partially evaluate the matrix operation based on each value in the range of values for the variable (604) which results in the generation of partial evaluation for each value in the range of values for the variable. In some examples, the partial evaluation for each value in the range of values may be specialized code that is generated (606) for each value in the range of values and stored. Then, when a particular matrix operation with a particular value for the variable is being evaluated, the particular piece of specialized code is selected and used. Continuing the example of the number of 0's in a matrix, consider another example. In certain cases, it may be known that matrices of a certain size (say a 4×4 matrix) have a predictable pattern of 0's in the matrix. One example of this predictable pattern is what is traditionally known as the zig-zag pattern illustrated below:

$$\begin{matrix} 15 & 14 & 10 & 9 \\ 13 & 11 & 0 & 0 \\ 12 & 0 & 0 & 0 \\ 0 & 0 & 0 & 0 \end{matrix}$$

This type of zig-zag pattern is common in representing DCT coefficients in compressed image or video streams. By tracing a zig-zag path from the top-left corner of the matrix all the way to the bottom right in a zig-zag fashion, one can represent this matrix as a sequence that is non-zero for the first 7 entries and 0 after that. This allows very efficient representations of these matrices. When processing a pre-encoded video or image stream, it is always known how many 0's are present in a matrix. When this matrix is used in other operations, for example a matrix multiplication operation, knowing the number of 0's can greatly reduce the number of operations required. So for such a matrix operation, we can generate 17 versions of the matrix multiply operation, each for the respective number of 0's from no zeros to 16 0's. When we process an image or a video stream at runtime, we can use the number of 0's to select between these 17 versions. Here is an example of matrix multiplication of a 4×4 matrix with another 4×4 matrix where it is known that the first matrix has 13 0's.

$$\begin{matrix} A_0 & A_1 & 0 & 0 \\ A_2 & 0 & 0 & 0 \\ 0 & 0 & 0 & 0 \\ 0 & 0 & 0 & 0 \end{matrix}$$

Multiplied by another matrix $$\begin{array}{cccc} B_0 & B_1 & B_2 & B_3 \\ B_4 & B_5 & B_6 & B_7 \\ B_8 & B_9 & B_{10} & B_{11} \\ B_{12} & B_{13} & B_{14} & B_{15} \end{array}$$

The code generated for this operation will be as follows (code shown for each matrix location as a 4×4 matrix):

| | | | |
|---|---|---|---|
| A[0]*B[0] + A[1]*B[4] A[2]*B[0] | A[0]*B[1] + A[1]*B[5] A[2]*B[1] | A[0]*B[2] + A[1]*B[6] A[2]*B[2] | A[0]*B[3] + A[1]*B[7] A[2]*B[3] |
| 0 | 0 | 0 | 0 |
| 0 | 0 | 0 | 0 |

It should be apparent that instead of consuming 16*7=112 operations (4 multiply operations and 3 add operations for each location in the result), this code only takes 16 operations to compute the result, or nearly a 7× reduction in the time taken to compute the result. Using this same logic, code can be generated for each value of the number of zeros in a zig-zag. pattern.

Then, when a matrix is encountered while processing the stream, that has say 13 0's in it in zig-zag fashion, the code shown above is selected from a table of functions and used to carry out the multiplication. If another matrix with a different number of zeros is encountered, the corresponding pre-generated code is selected.

Figure 7:
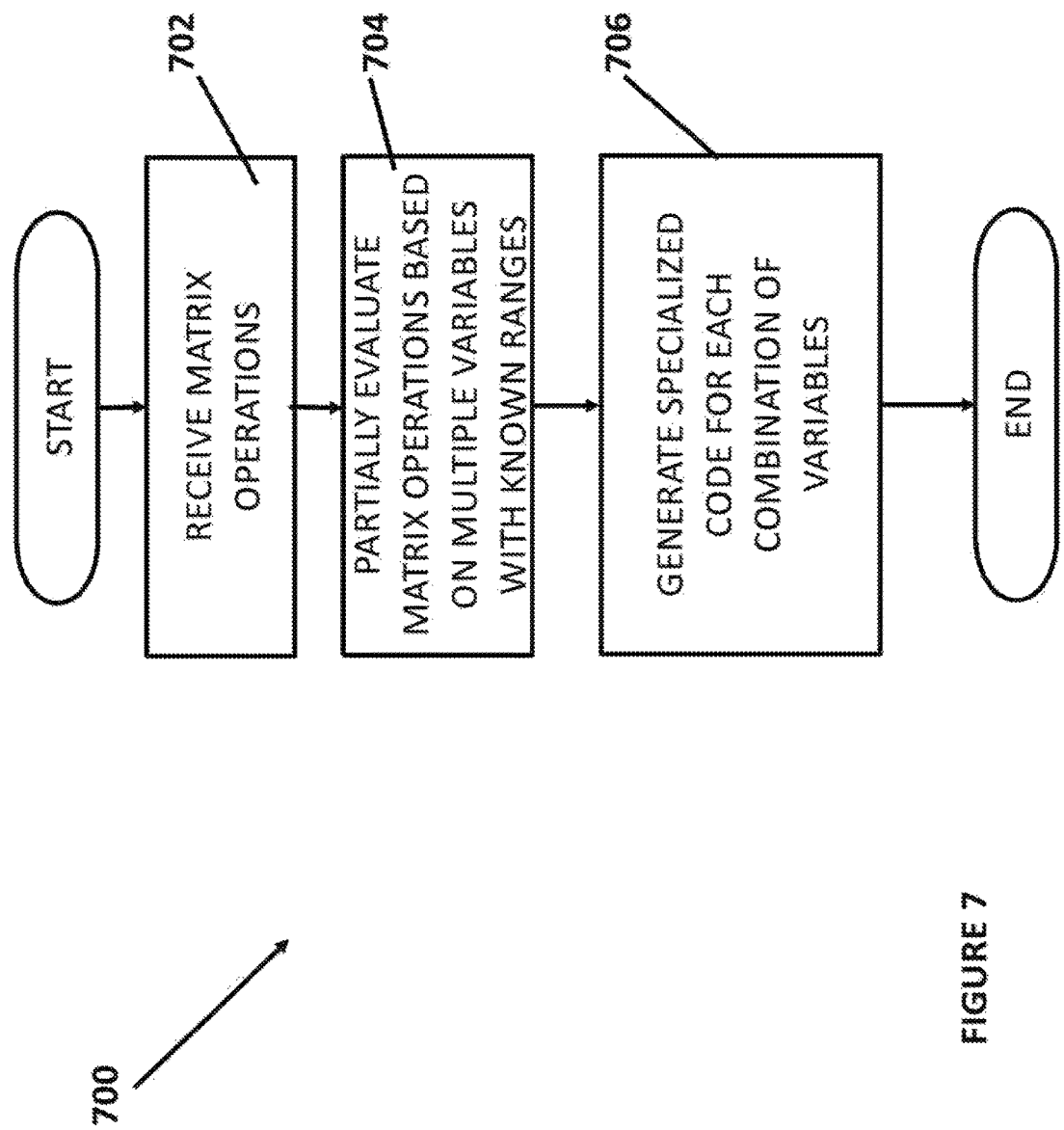
FIG. 7 is a flowchart illustrating a just in time signal processing partial evaluation.

FIG. 7 is a flowchart illustrating a just in time signal processing partial evaluation 700. In this method, the partial evaluator may receive a matrix operation (702) that has more than one variable that is known and each known variable has a range of known values. For example, a 16×16 block pixel decode in h.264 may have thirty two prediction variable values and four quantization known values which ultimately results in more than 50,000 different combinations of known variables for the 16×16 block pixel decode. In the just in time partial evaluation method, each combination of a known value for each variable is partially evaluated (704) and stored. In some examples, the partial evaluation may be specialized code that is generated (706) and may be stored. Then, when a particular matrix operation with a particular value for each variable is being evaluated, the particular piece of specialized code (or partial evaluation) that has been partially evaluated using the known values for each of the variables is used to perform the matrix operation. For example, we can consider the number of 0's and prediction mode to be two separate variables. The prediction mode determines a specific sequence of matrix operations (such as multiplication and addition with various constant matrices). With 32 prediction modes and 17 possibilities of number of 0's in a 4×4 matrix, a total of 32×17=544 functions are generated and stored in a table. So if we encounter a matrix with 12 0's and prediction mode 8, the corresponding function is looked up and used to process the matrix.

Figure 8:
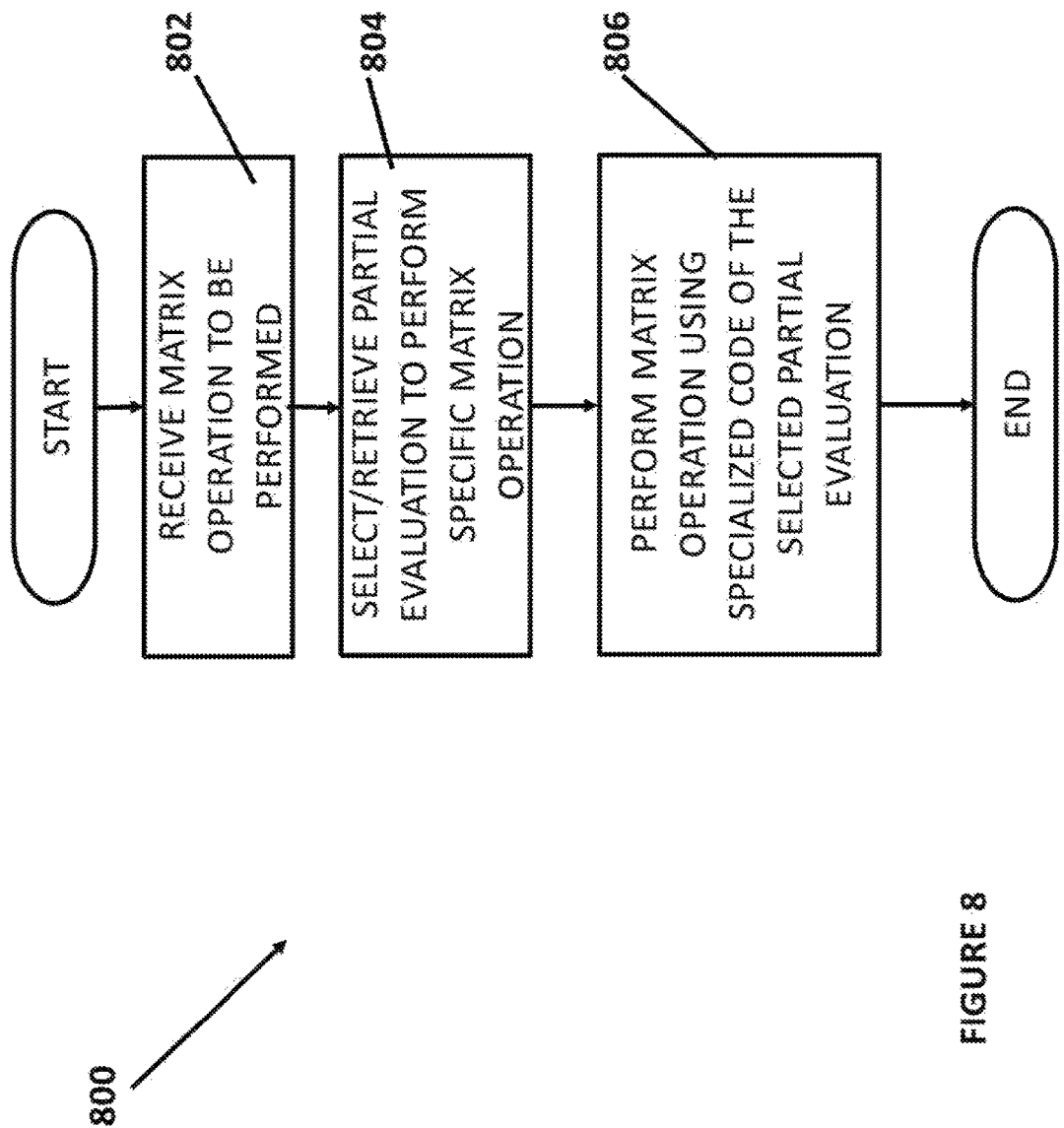
FIG. 8 illustrates a method for signal processing based on partial evaluation.

FIG. 8 illustrates a method 800 for signal processing based on partial evaluation. In the method, matrix operation to be performed is received by a signal processing unit (802.) The signal processing unit may be implemented in hardware or software and may be stored on and executed by the computer system in FIG. 2 or stored on the computer readable medium in FIG. 3. The signal processing unit may evaluate the received matrix operation and select/retrieve the partial evaluations to perform the received matrix operation (804.) The received matrix operation may be a defined matrix operation, such as a block decode, that has one or more variables that are known (constant, known value and/or known range of values) so that the appropriate partial evaluation(s) may be selected to perform the matrix operation. In some example, the matrix operation may be performed by one or more pieces of specialized code (generated from the appropriate partial evaluation(s)) (806.)

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A partial evaluation method, comprising:
generating a plurality of version of optimized code for a two dimensional matrix signal processing operation, each version of the optimized code generated based on a certain value of a known variable of the two dimensional matrix signal processing operation that permits a faster calculation of the two dimensional matrix signal processing operation for the certain value of the known variable;
receiving a signal processing task for a signal having a plurality of values, the signal being one of an image having a plurality of image values and a video having a plurality of video values, the signal processing task having a two dimensional matrix signal processing operation that operates on the plurality of values of the signal and the known variable having a particular known value in the two dimensional matrix signal processing operation; and
partially evaluating the two dimensional matrix signal processing operation using the known variable by selecting the version of the generated optimized code corresponding to the particular known value of the known variable to generate a partially evaluated signal processing operation and reduce the calculation time for the two dimensional matrix signal processing operation using the known variable.

2. The method of claim 1, wherein the piece of code is one of a C language function or a C++ language function.

3. The method of claim 1, wherein the known variable is a variable having a range of known values.

4. The method of claim 3 further comprising generating a piece of code for each known value of the variable.

5. The method of claim 4 further comprising selecting the piece of code based on the known value of the variable.

6. The method of claim 1, wherein the signal processing operation is a signal processing operation for digital display data.

7. The method of claim 6, wherein the signal processing operation is a matrix operation.

8. The method of claim 7, wherein the digital display data is one of image data and video data.

9. The method of claim 8, wherein the operation is a decode operation of the digital display data.

10. The method of claim 1, wherein the known variable is a plurality of variables wherein each variable has a range of known values.

11. The method of claim 10 further comprising generating a piece of code for each combination of two or more variables, each variable having a known value.

12. A partial evaluation method used for digital display data, comprising:
generating a plurality of version of optimized code for a matrix decode operation, each version of the optimized code generated based on a certain value of a known variable of the matrix decode operation that permits a faster calculation of the matrix decode operation for the certain value of the known variable;
receiving a decode matrix operation for decoding the digital display data and the known variable having a value in the matrix operation; and
partially evaluating the matrix decode operation using the known variable by selecting the version of the generated optimized code corresponding to the particular known value of the known variable to generate a partially evaluated matrix decode operation and reduce the calculation time for the matrix decode operation using the known variable.

13. The method of claim 12, wherein the piece of code is one of a C language function and a C++ language function.

14. The method of claim 12, wherein the known variable is a variable having a range of known values.

15. The method of claim 14 further comprising generating a piece of code for each known value of the variable.

16. The method of claim 15 further comprising selecting the piece of code based on the known value of the variable.

17. The method of claim 12, wherein the decode operation is a matrix operation.

18. The method of claim 12, wherein the known variable is a plurality of variables wherein each variable has a range of known values.

19. The method of claim 18 further comprising generating a piece of code for each combination of two or more variables, each variable having a known value.

20. A partial evaluation apparatus, comprising:
a processor, a memory and a plurality of lines of instructions configured to:
generate a plurality of version of optimized code for a two dimensional matrix signal processing operation, each version of the optimized code generated based on a certain value of a known variable of the two dimensional matrix signal processing operation that permits a faster calculation of the two dimensional matrix signal processing operation for the certain value of the known variable, receive a signal processing task for a signal having a plurality of values, the signal being one of an image having a plurality of image values and a video having a plurality of video values, the signal processing task having a two dimensional matrix signal processing operation that operates on the plurality of values of the signal and the known variable having a particular known value in the two dimensional matrix signal processing operation, partially evaluate the two dimensional matrix signal processing operation using the known variable by selecting the version of the generated optimized code corresponding to the particular known value of the known variable to generate a partially evaluated signal processing operation and reduce the calculation time for the two dimensional matrix signal processing operation using the known variable.

21. The apparatus of claim 20, wherein the piece of code is one of a C language function and a C++ language function.

22. The apparatus of claim 20, wherein the known variable is a variable having a range of known values.

23. The apparatus of claim 22, wherein the processor is configured to generate a piece of code for each known value of the variable.

24. The apparatus of claim 23, wherein the processor is configured to select the piece of code based on the known value of the variable.

25. The apparatus of claim 20, wherein the signal processing operation is a signal processing operation for digital display data.

26. The apparatus of claim 25, wherein the signal processing operation is a matrix operation.

27. The apparatus of claim 26, wherein the digital display data is one of image data and video data.

28. The apparatus of claim 27, wherein the operation is a decode operation of the digital display data.

29. The apparatus of claim 20, wherein the known variable is a plurality of variables wherein each variable has a range of known values.

30. The apparatus of claim 29, wherein the processor is configured to generate a piece of code for each combination of two or more variables, each variable having a known value.

31. A partial evaluation apparatus for digital display data, comprising:

a processor, a memory and a plurality of lines of instructions configured to:

generate a plurality of version of optimized code for a matrix decode operation, each version of the optimized code generated based on a certain value of a known variable of the matrix decode operation that permits a faster calculation of the matrix decode operation for the certain value of the known variable, receive a matrix decode operation for decoding the digital display data and the known variable having a value in for the matrix operation, partially evaluate the matrix decode operation using the known variable by selecting the version of the generated optimized code corresponding to the particular known value of the known variable to generate a partially evaluated matrix decode operation and reduce the calculation time for the matrix decode operation using the known variable.

32. The apparatus of claim 31, wherein the piece of code is one of a C language function and a C++ language function.

33. The apparatus of claim 31, wherein the known variable is a variable having a range of known values.

34. The apparatus of claim 33, wherein the processor is configured to generate a piece of code for each known value of the variable.

35. The apparatus of claim 34, wherein the processor is configured to select the piece of code based on the known value of the variable.

36. The apparatus of claim 31, wherein the decode operation is a matrix operation.

37. The apparatus of claim 31, wherein the known variable is a plurality of variables wherein each variable has a range of known values.

38. The apparatus of claim 37, wherein the processor is configured to generate a piece of code for each combination of two or more variables, each variable having a known value.

* * * * *